Patented Feb. 10, 1942

2,272,873

UNITED STATES PATENT OFFICE 2,272,873

GRINDING WHEEL

Samuel S. Kistler, West Boylston, Mass., assignor to Norton Company, Worcester, Mass., a corporation of Massachusetts No Drawing. Application November 28, 1939, Serial No. 306,545

6 Claims. (Cl. 51—298)

The invention relates to grinding wheels and other abrasive bodies bonded with organic bond. This application is a continuation in part of my copending application Serial No. 253,446 filed January 28, 1939.

One object of the invention is to provide an improved dry snagging wheel. Another object of the invention is to provide a grinding wheel or other abrasive body which, in various embodiments, may be substituted for abrasive bodies bonded with shellac, rubber, or phenol formaldehyde, and which will remove a greater amount of metal for a given wheel wear. Another object of the invention is to provide a resin bond for the manufacture of grinding wheels and other abrasive bodies having a chemical reaction with the work piece to increase the abrading action. Another object of the invention is to provide an ingredient for addition to an aromatic amine-aldehyde polymer which causes additional curing thereof when heated. Another object of the invention is to improve an aniline formaldehyde polymer. Another object of the invention is to improve an aniline formaldehyde bonded grinding wheel or other abrasive body. Another object of the invention is to get an acid to the surface of the work piece being ground without spreading it all over the work piece, thereby increasing the effectiveness of the grinding operation without etching the work piece or causing it to rust or otherwise detrimentally affecting it and without such disadvantages as spraying acid upon the operator, upon the grinding machine, or corroding the coolant pipes or coolant pump. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of abrasive grain, a quantity of an aromatic amine, a quantity of an aldehyde, and a quantity of a high molecular weight organic compound containing a halogen, which compound is capable of splitting off HCl or other hydrogen halide at elevated temperatures. According to the present invention I take aniline or other aromatic amine, and formaldehyde or other aldehyde, and modify the product with polyvinyl chloride or other high molecular weight organic compound containing a halogen which is capable of splitting off HCl or other hydrogen halide at elevated temperatures. Preferably I first produce a polymer from the reaction of aniline with formaldehyde and mix it with polyvinyl chloride, and form an abrasive body by mixing this mixture with abrasive grains, then molding, pressing and heating the mixture to a temperature capable of causing further reaction. The preferred aromatic amine useful in my invention is aniline, but other aromatic amines may be used, for example diamino diphenyl methane or meta phenylene diamine. The preferred aldehyde used in my invention is formaldehyde and so far as I now know this gives better results than other aldehydes. Secondly, however, I may use furfural, and in particular I find it advantageous to use both formaldehyde and furfural, using formaldehyde for the initial formation of the resin and furfural to complete the reaction. Any abrasive grain may be used, for example, fused alumina and other kinds of alumina, as emery or corundum, silicon carbide or other hard carbides, quartz, glass, garnet or diamonds.

Aniline,

reacts with formaldehyde, HCHO, to produce a long chain polymer which when an excess of formaldehyde above the stoichiometric proportions is used, for example 20% excess of formaldehyde, has adjacent chains connected with methylene groups to form a tough, heat resistant, semi-thermoplastic resin. One mol of aniline will react with not more than three mols of formaldehyde. When polyvinyl chloride, whose empirical formula may be written $(C_2H_3Cl)x$, is added to the polymer formed from aniline and formaldehyde, as above stated, and the mixture is heated to a temperature of the order of 150° C., hydrogen chloride migrates from the polyvinyl chloride to the aniline formaldehyde, attaching itself to the secondary amine groups. When the resin so produced is mixed with abrasive grains and a grinding wheel is formed therefrom, I find superior results in grinding can be achieved. I have observed this especially in that type of grinding known as dry snagging where the object is to clean off the fins, risers, cores and the like from rough castings and which involves the removal of much metal, the desideratum being to take it off as quickly as possible with a minimum amount of wheel wear. It is my belief that improved results in grinding with wheels made according to the present invention are due to the release of hydrogen chloride at the grinding line from the bond caused by the generation of heat at this line, and the reaction of the thus liberated hydrogen chloride with the metal of the work piece. It is my theory that the chips of metal clear themselves from the abrasive grains more readily when their adhesion to the abrasive grains is broken by the presence of an acid.

Furthermore, there is an added advantage of using polyvinyl chloride or other substance capable of liberating hydrogen chloride as aforesaid, in that the addition of the hydrogen chloride to the aniline formaldehyde hardens it and raises its heat resistance. Thus the bond according to the present invention has characteristics excellent for snagging operations and in certain qualities is superior to plain aniline formaldehyde.

Considering now specific examples of the manufacture of grinding wheels in accordance with the present invention, I may proceed as follows:

*Example I*

Eight hundred and fifty-eight cubic centimeters of aniline were dissolved in eight liters of water containing nine and three-tenths mols of hydrochloric acid. To this were added eight hundred and fifty cubic centimeters of formalin solution containing four-tenths grams of formaldehyde per cubic centimeter. After standing for one hour, a quantity of sodium hydroxide was added equivalent to the hydrochloric acid present. The precipitated resin was filtered, washed, dried and ground to a fine powder. Into each ten pounds of this powdered resin I mixed two and two-tenths pounds of polyvinyl chloride. Twenty-eight and one-tenth pounds of a porous, relatively pure grade of fused alumina abrasive No. 20 grit size was wet with twenty-three hundredths of a pound of furfural. Then five and nine-tenths pounds of the above resin were intimately mixed with the fused alumina wet with furfural, spread in an eighteen inch mold with a five inch arbor, and hot pressed for one hour and a half at a temperature of 160° C. under a pressure of three tons per square inch. The wheel was then stripped from the mold.

This made an excellent snagging wheel and, in fact, a superior snagging wheel when compared with any organic bonded snagging wheel.

*Example II*

Thirty-seven pounds of fourteen mesh fused alumina abrasive was placed in a mixing pan and wet with five hundred and forty cubic centimeters of furfural. To this were added nine pounds of the resin from Example I and two pounds of cryolite. The mixture was spread in a sixteen inch mold with a six inch arbor and hot pressed for two hours at a temperature of 160° C. and under a pressure of five hundred tons. The wheel so produced gave as good a finish on stainless steel as rubber wheels, but was very much more durable.

*Example III*

Nineteen hundred and eighty grams of diamino-diphenyl-methane was dissolved in eight liters of water containing twenty mols of hydrochloric acid. To this solution was added eighteen hundred cubic centimeters of formalin solution containing four-tenths gram formaldehyde per cubic centimeter. After standing one hour a quantity of sodium hydroxide was added equivalent to the hydrochloric acid used. The precipitated resin was filtered, washed, dried, and ground to a fine powder.

Eight hundred and eighty-five grams of sixty mesh fused alumina was mixed dry with one hundred and sixty grams of the above powdered resin and forty-nine grams of polyvinyl chloride. This mixture was spread in an eight inch mold and pressed at a temperature of 175° C. under a pressure of one hundred and fifty tons for half an hour. This constitutes a grinding wheel the resin bond of which is hard, tough and heat resistant. During a grinding operation the bond of such a wheel, as well as the bonds of the wheels of the other examples, liberates hydrogen chloride at the grinding line which appears to have a pronounced effect on the grinding operation.

*Example IV*

Ten hundred and eighty grams of metaphenylene diamine was dissolved in eight liters of water containing twenty mols of hydrochloric acid. To this solution was added seven hundred and fifty cubic centimeters of formalin containing four-tenths gram formaldehyde per cubic centimeter. After standing one hour a quantity of sodium hydroxide was added equivalent to the hydrochloric acid used. The precipitated resin was filtered, washed, dried, and ground to a fine powder.

Eight hundred and eighty-five grams of sixty mesh fused alumina was mixed dry with one hundred and sixty grams of the above powdered resin and forty-nine grams of polyvinyl chloride. This mixture was spread in an eight inch mold and pressed at a temperature of 175° C. under a pressure of one hundred and fifty tons for half an hour. This wheel has characteristics similar to the wheels of the other examples.

In order to liberate HCl or other hydrogen halide, I may use other organic compounds beside polyvinyl chloride. For example, I may use rubber hydrochloride, chlorinated rubber, chlorinated polyisobutylene, or polyvinylidine dichloride. The quantities of any of these may be the same as that of the polyvinyl chloride in the preceding examples. Thus I in effect teach a great number of additional examples since it may be considered that any of the foregoing are substituted in the foregoing examples for polyvinyl chloride.

During the hardening of the abrasive body and, if a non-abrasive resin is produced, during the hardening of the resin, hydrogen chloride (or other hydrogen halide) migrates from the polyvinyl chloride or homologue to the aniline formaldehyde or homologue. This produces a condition of high polarity in the combined molecule of the resin which considerably hardens it and also increases its heat resistance.

It should be understood that in the foregoing examples the abrasive may be omitted whereupon a tough, hard and heat resistant resin will be produced. For the production of many useful articles, such as boxes of all descriptions, smokers' pipes, distributor casings, and other articles too numerous to mention, the resin of the invention may be used, either with or without fillers. The abrasive grain being in one sense a filler, other fillers might be substituted therefor, for example, clay, wood flour, limestone and plaster of Paris. Such non-abrasive products are claimed in my divisional application, Serial No. 318,004 filed February 8, 1940.

Nevertheless it should be clearly understood that the product of the invention when embodied in a grinding wheel has characteristics not heretofore present in grinding wheels and due to the liberation of hydrogen chloride or other hydrogen halide at the grinding line which, as heretofore partially explained, gives a grinding effect on metals not heretofore encountered. Although I believe the foregoing explanation that the acid clears the metal chips more readily and that there is a definite reaction between the hydrogen chloride and the metal is correct, my invention should not be limited by this theory of the beneficial results.

*Comparative grinding data*

Two wheels were manufactured, one with and one without polyvinyl chloride, as follows: Each wheel was sixteen inches in diameter by two inches thick with a six inch central hole. Each wheel had fused alumina abrasive of No. 16 grit size. Each wheel consisted of 60% by volume of abrasive and 40% by volume of bond. The porosity of each wheel was substantially zero. The composition of the bond of wheel A was 30% cryolite, 5% quick lime (CaO) and the remainder aniline formaldehyde resin. The composition of the bond of wheel B was 30% cryolite by volume, 5% quick lime (CaO) by volume, 10% polyvinyl chloride by volume and the remainder aniline formaldehyde. Comparative grinding results were as follows: Under absolutely the same conditions of material being ground, grinding pressure and peripheral velocity of the wheels, wheel B had a rate of cut which was 86% of that of wheel A, and wheel B had a rate of wear which was 44% of that of wheel A.

Wheels C and D, whose size, grit size, structure and porosity were the same as that of wheels A and B, had bond compositions as follows: The bond of wheel C was 100% aniline formaldehyde. The bond of wheel D was 20% polyvinyl chloride and 80% aniline formaldehyde. Comparative results were as follows: Wheel C wore 31.4 cubic inches in an hour while cutting 20.8 pounds of stainless steel. Wheel D wore 10.5 cubic inches in an hour while cutting 16.5 pounds of stainless steel.

In the above comparative grinding data, it will be noted that the weight of material cut per volume of abrasive worn away was measurably increased by the use of polyvinyl chloride. This is the true criterion of the cutting ability of a grinding wheel. In the examples given, the absolute rate of cut was decreased by the use of polyvinyl chloride in the bond. But this was due to the fact that the bond was made harder, as heretofore explained. In order to achieve the same rate of cut per hour using polyvinyl chloride in the bond as without the use thereof, a greater grinding pressure could be used and under such circumstances the increased efficiency of the grinding wheel using polyvinyl chloride would appear from the relatively small amount of wheel wear which, with all factors except pressure being the same, would be found to be considerably less than in the case of grinding wheels bonded with aniline formaldehyde without the polyvinyl chloride.

In the preceding examples the aromatic amine was condensed with the aldehyde in the presence of hydrochloric acid. However, other strong acids may be used. I have condensed aniline and formaldehyde in the presence of sulphuric acid, hydriodic acid and phosphoric acid and obtained the characteristic tough solid that is obtained when they are condensed in the presence of hydrochloric acid. It should be understood that when aniline and formaldehyde or any other aromatic amine, on the one hand, and any other aldehyde, on the other hand, are condensed not in the presence of a strong acid, a substance varying all the way from a gummy substance to a rosin-like substance is produced. The resin produced by condensing these ingredients in the presence of a strong acid is, therefore, quite distinguishable from the resin produced by the same ingredients condensed not in the presence of a strong acid.

As illustrating the distinction between the reaction of aniline and formaldehyde with and without the presence of a strong acid, the ordinary reaction and polymerization without the presence of a strong acid may be indicated as follows:

First stage—simple reaction of aniline and formaldehyde:

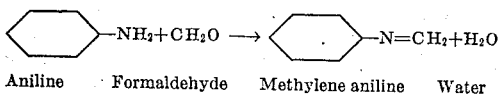

Aniline    Formaldehyde    Methylene aniline    Water

Second stage—spontaneous polymerization of the methylene aniline to anhydro formaldehyde aniline:

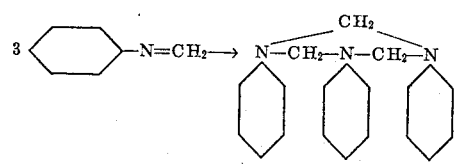

On the other hand, in the presence of a strong acid the condensation and polymerization involves a complete rearrangement of the last mentioned anhydro formaldehyde aniline to anhydro-paraminobenzyl alcohol, i. e. to

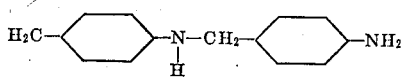

or to a more highly polymerized form of the same.

If an amount of formaldehyde more than equivalent to that of the aniline is taken, in a solution containing strong acid, the reaction may advance to much larger molecular networks and yield internally reinforced resins. The following illustrates such a network:

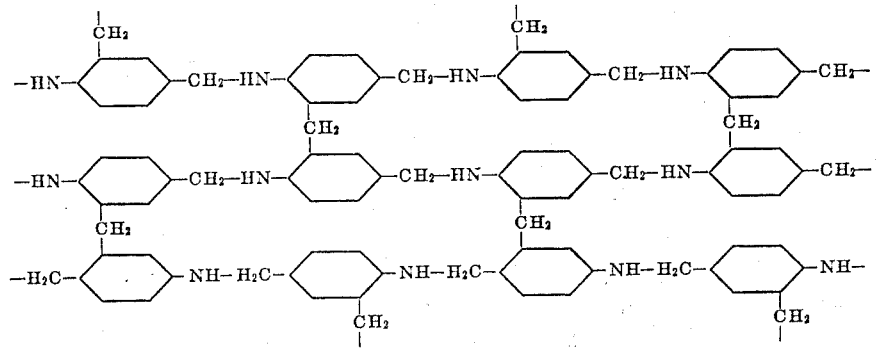

It may be observed that phosphoric acid gives a tougher and more flexible product than hydriodic acid. In referring to the condensation product of aniline and formaldehyde as tough, I mean as compared with phenol formaldehyde polymer. Any mineral acid may be used to condense an aromatic amine and an aldehyde in accordance with this invention.

Organic acids also may be used provided they are highly ionized and non-oxidizing in dilute solution. For example, trichlorocetic acid will produce a condensate of the tough variety similar to that produced by condensing the ingredients in the presence of hydrochloric acid. Other organic acids which may be used are dichlorocetic acid, maleic acid, oxalic acid and picric acid. Such acids I refer to in the following claims as "strong acids."

It will thus be seen that there has been provided by this invention a composition of matter and an article of manufacture in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. An abrasive body comprising abrasive grains bonded with the condensation product of one molecular proportion of primary aromatic amine and between one and three molecular proportions of aldehyde selected from the group consisting of formaldehyde and furfural, condensed in the presence of at least approximately one molecular proportion of acid at least as strong as phosphoric acid and reacted by heating at resin curing temperatures with an organic aliphatic chlorinated polymer selected from the group consisting of polyvinyl chloride, rubber hydrochloride, chlorinated rubber, chlorinated polyisobutylene and polyvinylidene dichloride.

2. An abrasive body comprising abrasive grains bonded with the condensation product of one molecular proportion of aniline and between one and three molecular proportions of aldehyde selected from the group consisting of formaldehyde and furfural, condensed in the presence of at least approximately one molecular proportion of acid at least as strong as phosphoric acid, and reacted by heating at resin curing temperatures with an organic aliphatic chlorinated polymer selected from the group consisting of polyvinyl chloride, rubber hydrochloride, chlorinated rubber, chlorinated polyisobutylene and polyvinylidene dichloride.

3. An abrasive body comprising abrasive grains bonded with the condensation product of one molecular proportion of primary aromatic amine and between one and three molecular proportions of formaldehyde, condensed in the presence of at least approximately one molecular proportion of acid at least as strong as phosphoric acid and reacted by heating at resin curing temperatures with an organic aliphatic chlorinated polymer selected from the group consisting of polyvinyl chloride, rubber hydrochloride, chlorinated rubber, chlorinated polyisobutylene, and polyvinylidene dichloride.

4. An abrasive body comprising abrasive grains bonded with the condensation product of one molecular proportion of aniline and between one and three molecular proportions of aldehyde consisting at least in part of formaldehyde, condensed in the presence of at least approximately one molecular proportion of acid at least as strong as phosphoric acid, and reacted by heating at resin curing temperatures with an aromatic aliphatic chlorinated polymer selected from the group consisting of polyvinyl chloride, rubber hydrochloride, chlorinated rubber, chlorinated polyisobutylene and polyvinylidene dichloride.

5. An abrasive body according to claim 1 in which the organic aliphatic chlorinated polymer is polyvinyl chloride.

6. An abrasive body according to claim 1 in which the organic aliphatic chlorinated polymer is polyvinylidene dichloride.

SAMUEL S. KISTLER.